United States Patent [19]

Bianco

[11] 4,090,380
[45] May 23, 1978

[54] DETACHABLE KEY SECURITY ASSEMBLY

[76] Inventor: Eric L. Bianco, 120 E. Price St., Linden, N.J. 07036

[21] Appl. No.: 777,966

[22] Filed: Mar. 16, 1977

[51] Int. Cl.² ............................................. A47G 29/10
[52] U.S. Cl. ...................................... 70/456 R; 70/19
[58] Field of Search .......................... 70/14, 15, 17-19, 70/57-66, 456-459

[56] References Cited

U.S. PATENT DOCUMENTS

| 3,512,380 | 5/1970 | Winter | 70/19 |
| 3,987,653 | 10/1976 | Lyon | 70/19 |

Primary Examiner—Robert L. Wolfe
Attorney, Agent, or Firm—Daniel H. Bobis

[57] ABSTRACT

A detachable key security assembly for preventing the unauthorized use of a key, more particularly to render the car key of a car parked in a parking lot temporarily non-usable so it can be left in the parked car and the theft of such car thereby prevented, has an elongated housing with a bore extending in from one end substantially the full length thereof to provide an open end and a closed end on said elongated housing, at least one sized slot in the walls of the elongated housing is provided through which the key to be secured is inserted, a gripping assembly in the housing is disposed for operative engagement with any key inserted in said sized slot, an actuator for operating said gripping assembly to engage and release said key includes, a unique shaped stud thereon, and a wrench disposed to extend into said housing has a matching end to fit the unique shaped stud of the actuator so as to operate said gripping assembly.

6 Claims, 7 Drawing Figures

U.S. Patent May 23, 1978 4,090,380
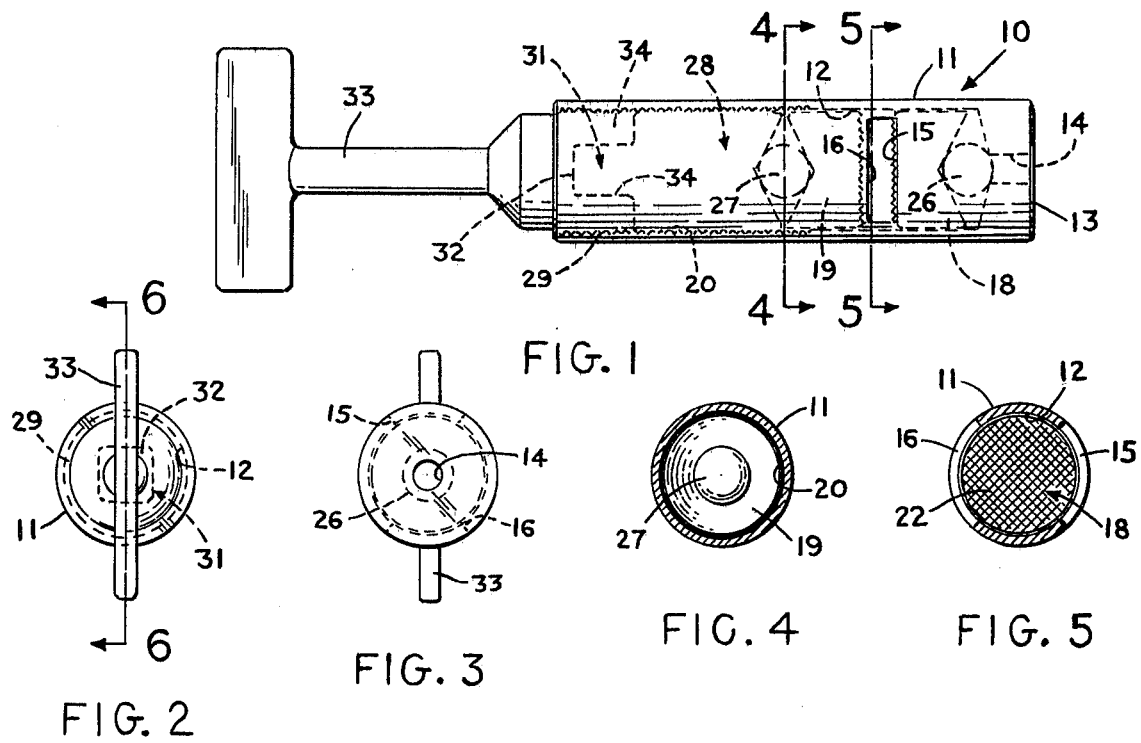
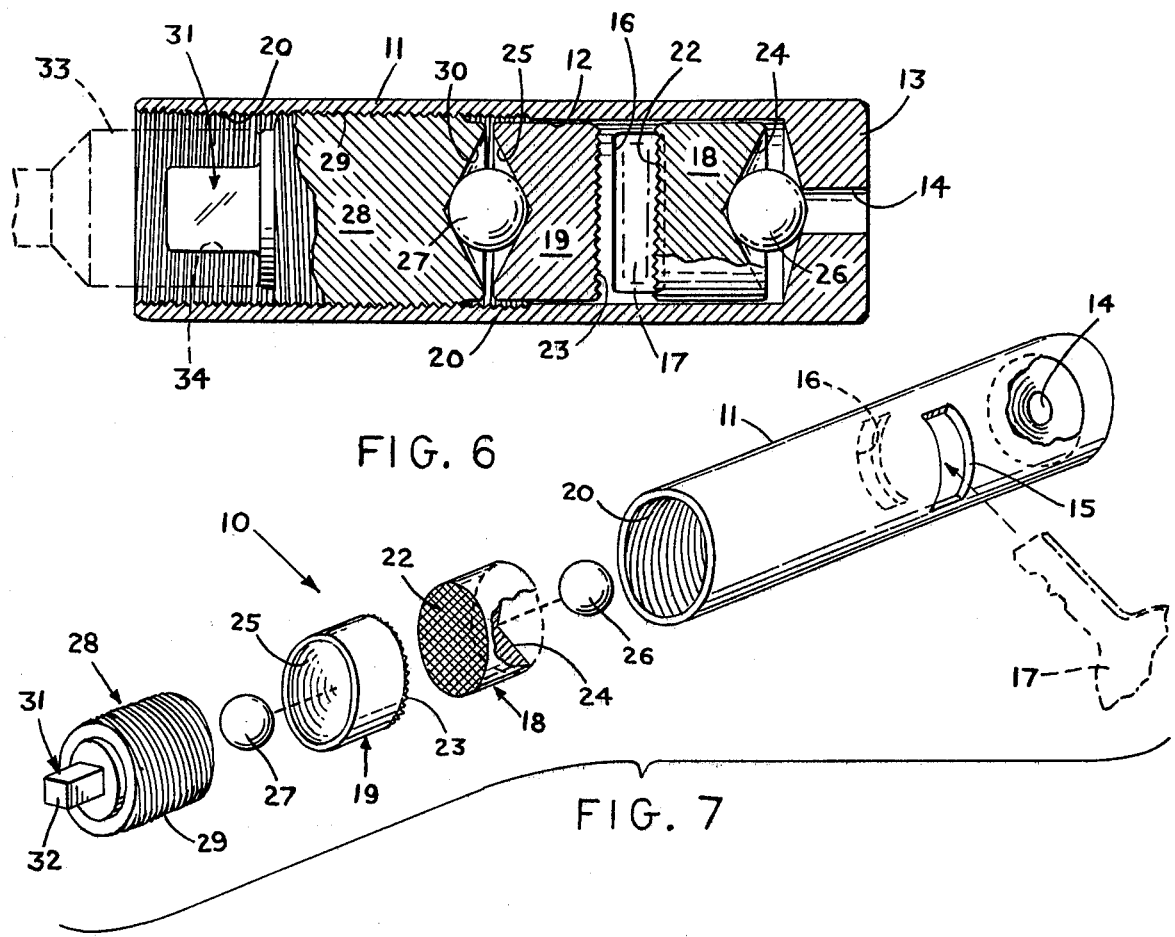

DETACHABLE KEY SECURITY ASSEMBLY

BACKGROUND OF THE INVENTION

This invention relates generally to a device for preventing the theft of a vehicle or other key operated device and more particularly to a light easily portable but relatively strong assembly for holding and securing a key therein so as to render the key temporarily non-usable.

The present invention is particularly applicable to the ignition keys of automobiles that are parked for varying periods of time at a parking facility particularly those which have a valet type parking facility. It is common practice for the attendant to receive the customer's automobile with the ignition key therein, park the customer's automobile, and secret the key within the car until the customer returns where upon the attendant will return to the parked automobile, locate the secreted key and then drive the automobile back to the waiting customer.

The reason for leaving the ignition key in the car is for convenience and to save the time that an attendant must expend in checking the key and retrieving the key in order to return the car to the customer.

If the ignition key of a customer is checked, it requires a tag and a secure place to store the key such as in an office which is policed at all times and further requires that the checked key be available at all times when the customer returns for the car.

Where the key is checked it is clear that the attendant is required either to take the key from the particular rack or obtain it from the person responsible for policing the secured keys.

Management has determined that this practice does not always work because despite the security, keys are either misplaced, mistagged or even lost during the handling thereof. Additionally, checking causes a large expenditure of the attendant's time in both bringing the ignition key in to be checked and for retrieving the key when the customer needs the automobile and this therefor makes it necessary to have additional attendants and increases the overhead of the parking facility operation.

However, if an ignition key is left in the parked automobile the incidence of non-professional car theft goes up drastically to the extent that parking facilities must now be substantially self insurers of vehicles parked in their parking facility.

Accordingly, the management of parking facilities particularly those where the ignition keys are left with the parked automobile have made efforts to provide simple relatively, low cost devices for securing the ignition key within such parked cars against tampering, which devices at the same time can be easily carried and utilized by the attendants.

One such device consisted of a cast aluminum box with a shackle and a cover that could be locked and unlocked. The shackle acted to lock the box about the ignition keys located on the steering wheel. These devices were cumbersome and further could not be used where the ignition keys were located on the dashboard of the automobile such as occurs in automobiles of foreign manufacture.

The detachable key securing assembly in accordance with the present invention seeks to overcome the problems of prior art devices by providing a compact relatively light portable but strong assembly which grips the key in a manner rendering the key temporarily non-usable until the assembly is again detached from the key or conveniently the key is released so it can be removed from the key securing assembly.

SUMMARY OF INVENTION

Thus, the present invention covers a key securing assembly for temporarily rendering a key non-usable having, an elongated housing with a bore therein opened at one end of the housing and closed at the end remote therefrom, a key receiving slot extends through the wall of the housing so that a key can be inserted into juxtaposition with the bore in the housing, gripping means in the bore is disposed for operative engagement with any key inserted therein through the key receiving slot, an actuating means having a special operator is disposed at the bore for actuating the gripping means into and out of the engagement with the key.

Accordingly it is an object of the present invention to provide an anti-theft device for preventing the theft of an automobile or other key operated device.

It is another object of the present invention to provide a key securing assembly in which a key can be removably connected to render the key temporarily non-usable.

It is another object of the present invention to provide a compact portable relatively strong key securing assembly for holding the ignition key of an automobile so as to temporarily prevent any unauthorized use of the automobile or the theft thereof.

Other objects and advantages of the invention will be apparent from the following detailed description taken in conjunction with the accompanying drawings wherein:

FIG. 1 is a side view of a key securing assembly in accordance with the present invention.

FIG. 2 is an end view from the open end of the key securing assembly shown in FIG. 1.

FIG. 3 is an end view from the closed end of the key securing assembly shown in FIG. 1.

FIG. 4 is a cross-section taken on line 4—4 of FIG. 2.

FIG. 5 is a cross-section taken on line 5—5 of FIG. 1.

FIG. 6 is a cross-section taken on line 6—6 of FIG. 1.

FIG. 7 is an exploded perspective view partly invertical section of the key securing assembly shown in FIG. 1 of the drawings.

Referring to the drawings FIGS. 1 to 7 show one form of key securing assembly generally designated 1 which is detachably connected to a key 2 which is inserted into the key securing assembly as is hereinafter described.

The key securing assembly has an elongated housing 11 with an elongated bore 12 so that the housing is open at one end and has an end wall 13 as is shown in FIGS. 1, 2, 3 and 4 of the drawings.

The end wall 13 is provided with an opening therethrough to permit air to pass in and out of the bore 12 so that the elements therein as hereinafter described will be free to move during assembly in the bore and during operation of the key securing assembly. Additionally the opening 14 provides means for lubricating the elements in the housing 11.

In this form of the invention a pair of aligned slots 15 and 16 are formed in the side walls of the housing 11 so that the key 1 such as an ignition key of an automobile can be inserted into and through said slots so as to be transversely disposed relative the longitudinal axis of the bore in the housing 11 as is shown in FIGS. 1, 4 and 7 of the drawings.

The housing 11 and the slots 15 and 16 will be sized as a function of the thickness and width of the largest key which the particular application may require be held in the key securing assembly 1. This for example in the case of ignition keys will require that the slot exceeds one-eighth of an inch in width and slightly greater than seventeen-sixteenths of an inch in length. This slot size requires that the housing 11 of the key securing assembly 1 for ignition keys will have to have an outer diameter of at least 5/16ths of an inch and a bore or either diameter slightly in excess of one-half of an inch.

If other types of keys are to be held in the key securing assembly than the same principals can be applied in order to establish the dimensions for the slots 15 and 16 and the housing 11.

In order to engage and firmly hold the key 1 which has been inserted through the slots 15 and 16, the key securing assembly 10 is provided with a set of vise jaws 18 and 19 which are slidably mounted in the portion of the bore which is inwardly of the threaded portion 20 thereon as is shown in FIGS. 4 and 7 of the drawings.

The vise jaws 18 and 19 are identical in construction and are shown as cylindrical elements which lie in the bore 12 so that their respective roughened or knurled gripping faces as at 22 and 23 face each other and will when moved together act to grip and firmly hold the key 2 inserted through the slots 15 and 16 as is described more fully below.

On the side of the vise jaws 18 and 19 remote from the gripping faces 22 and 23, the vise jaws are provided with cone shaped indentations 24 and 25. These indentations coact with ball-bearing elements 26 and 27 which are adopted to center against the cone shaped indentations 24 and 25 when the vise jaws 18 and 19 are actuated to engage the inserted key. By further reference to FIG. 6 it will be clear that while the vise jaws 18 are freely slidable axially in bore 12 that in fact the axial movement is very limited as it lies on the side of the slots 15 and 16 closely adjacent to the end wall 13 of the housing 11. It has however sufficient freedom of movement to permit the vise jaw 18 to rotate about the ball bearing 26 and is therefore self-centering to permit cooperation with the vise jaw 19.

The vise jaw 19 is also freely slidable axially in the bore 12 but its axial movement is adjusted by an arbor 28 which is threaded on the outer face thereof as at 29 so that it can be threadibly mounted for movement to and fro along the threaded portion 20 of the bore 12.

Arbor 28 is preferably a solid element which is cone shaped as at 30 on the end face thereof which faces the ball-bearing 27 so that the ball-bearing 27 can also center against the inner adjacent end face 30 of the arbor 28 and the cone shaped face 25 of the vise jaw 19 and therefore transmit the forces exerted by the arbor to the vise jaw 19 when the arbor 28 is moved inwardly to the bore 12.

It will be clear to those skilled in the art that as the arbor 28 is threaded inwardly, it will force the vise jaws 18 and 19 towards each other and therefore into engagement with the key 2 therebetween and that the vise jaws 18 and 19 can exert enormous pressures to grip and hold the key 2 once they are moved into this engaged position. However when the arbor 28 is threaded to move the arbor outwardly along the bore 12 then the vise jaws 18 and 19 being freely mounted in the bore will disengage from their gripping action with the key 2 and the key 2 can then be easily removed from the slots 15 and 16.

In order to provide a simple means for moving the arbor 28, the outer end face is provided with a stud 31 having a special configuration 32 which can only be fitted by a wrench 33 having a mating head 34 which matches the special configuration 32 for the particular stud 31.

Thus because the arbor 28 lies within the bore 12, the stud 31 will also be recessed in the bore and therefore the mating head 33 must not only have a configuration to fit the configuration 32 of the stud 31 but additionally must be sufficiently elongated to extend into the bore for engagement with the stud. It is thought elementary that the stud must not have a conventional configuration that would be easily adaptable to any conventional type of wrench such as a skate key wrench or the like and that part of the versatility of the key securing assembly in accordance with the present invention which prevents a thief from releasing the key 2 from the key securing assembly is the special configuration of the stud 31.

As a practical matter for every 100 key securing assemblies 5 wrenches having the unique mating configuration for the stud 31 will be adequate for even a large size parking lot with valet servicing.

If a wrench is stolen, the arbor can be replaced with a stud having a different configuration and new wrenches issued to the attendents for use therewith.

The operation or use of the detachable key securing assembly in accordance with the present invention is best described for its particular application, mainly at a parking lot facility. Thus, an attendant can carry at least 10 of these detachable key securing assemblies as above described because they are light and small and therefore easily portable.

After parking a customer's automobile, the ignition key would be removed and inserted through the slots 15 and 16 of one of the key securing assemblies 1 and then by means of the wrench 33 the mating head 34 would be fitted to the special configurations 32 on the stud 31 of the arbor 28 in the key securing assembly 1.

The arbor 28 is threaded by the wrench into bore 12 until the vise jaws 18 and 19 are in firm gripping engagement with the key 2 and the key securing assembly with the ignition key grip therein can be left on the floor or seat of the parked automobile.

When the attendant returns to retrieve the automobile for the customer he will apply the mating wrench 33 once again to the stud 31 and disengage the vise jaws 18 and 19 to release the ignition key 2 for use in starting the parked automobile and to permit the automobile to be returned to the customer.

The key securing assembly 1 will be kept in the attendant's pocket for use on the next car that is parked by the attendant.

The key securing assembly 1 can exert very great forces by the gripping action of the vise jaws 18 and 19 as above described because the device provides a mechanical advantage of approximately 100 to 1 because an attendant can turn the wrench 33 at a force of about 20 ft. lbs.

Therefore an ignition key will be held with approximately 2,000 lbs. of axial torque and any efforts to forceably remove the key will result in destruction of the key.

Therefore once the ignition key is placed in the key securing assembly, it cannot be removed without destroying the key and therefore the key cannot be used by a vandal or non-professional attempting to steal the parked car.

It will be clear that the cost of the replacement of the key will be infinitively small when compared to the cost and expense of replacing the stolen vehicle.

Thus a relatively simple, cheap key securing assembly has been described which is particularly adaptable to the parking lot industry. It will however be understood that the device is capable of many other uses for protecting keys or for securing like devices that need to be kept and protected from unauthorized use.

It will be appreciated that the foregoing description illustrates only one preferred embodiment of the present invention and that the same can be changed and modified by those skilled in the art without departing from the spirit and scope of the invention as the same is defined by the Claims hereinafter set forth.

What is claimed is:

1. A portable key securing assembly for rendering a key temporarily non-usable comprising,
    a. an elongated housing,
    b. a bore in said housing open at one end and having a closure abutment at the other end,
    c. slot means providing a passage through the housing for extending a portion of a key to be secured into operative relation with the bore in said housing,
    d. gripping means in said housing including, a pair of coacting vise jaws freely mounted in the bore in said housing with one of said coacting jaws on one side of the slot means and the other on the opposite side of said slot means to engage and disengage the portion of the key extended into the slot means through the housing,
    e. at least one of said coacting jaws having a self centering means thereon to enable the coacting jaws to move into gripping alignment with the portion of the key extended into the slot means,
    f. an actuator slidably mounted in the bore of said housing to abut and move at least one of said coacting jaws including, a stud for operating the actuator extending towards the open end of said bore and having a unique configuration on said stud, and
    g. a mating wrench to fit the configuration of said stud and extendable into the bore in the housing to operate the actuator.

2. In a key securing assembly as claimed in claim 1 wherein the slot means are disposed so that the key will extend into the housing transversely of the longitudinal axis thereof.

3. A key securing assembly for rendering a key temporarily non-usable comprising,
    a. an elongated housing,
    b. a bore in said housing open at one end and closed at the other end,
    c. slot means providing a passage through the wall of the housing for extending a portion of a key to be secured into operative relation with the bore in said housing,
    d. gripping means in the bore of said housing disposed relative the slot means to engage and disengage the portion of the key extended into the slot means through the housing,
    e. the gripping means includes,
        1. a first vise jaw disposed in said housing on the side of said slot adjacent the closed end of the bore,
        2. a second vise jaw disposed in said housing on the side of said slot remote from the first vise jaw,
    f. the bore has the portion adjacent the open end thereof threaded,
    g. an actuator mounted in the bore of said housing including,
        1. stud means extending towards the open end of said bore having a unique configuration thereon, and
        2. an arbor continuous with said stud threaded on the outer face thereof and threadably mounted in said threaded portion of the bore to retain the first vise jaw and second vise jaw within said housing and movable to move said gripping means into engagement with the portion of the key inserted into said housing and to release the same, and
    h. a mating wrench to fit the unique configuration of said stud and extendible into the bore in the housing to operate said actuator.

4. In a key securing assembly as claimed in claim 3 wherein,
    a. said first vise jaw has a gripping face and a cone shaped face on the side remote from the gripping face,
    b. a first ball bearing member disposed in the housing to coact with the cone shaped face for centering said first vise jaw,
    c. said second vise jaw has a gripping face disposed to coact with the gripping face of said first vise jaw and a cone shaped face on the side of the second vise jaw remote from the gripping face,
    d. a second ball bearing member disposed in the housing to coact with the cone shaped face on the second vise jaw for centering said second vise jaw, and
    e. said arbor having a cone shaped face on the side thereof facing the second ball bearing member whereby the forces exerted by the arbor will be uniformly distributed to the first vise jaw and second vise jaw when they are moved into the engaged position.

5. In a key securing assembly as claimed in claim 3 wherein the slot means in the housing is disposed so the key will have at least a portion thereof lying transversely of the longitudinal axis of the bore in the housing.

6. In a key securing device as claimed in claim 1 wherein the slot means is sized to permit a range of key sizes to be extended into the bore in said housing, and the gripping jaws have beveled edges to facilitate insertion of any given sized key within said range of key sizes.

* * * * *